(No Model.)
A. WOLFF.
COMBINED FLOUR BIN AND SIFTER.
No. 509,276. Patented Nov. 21, 1893.
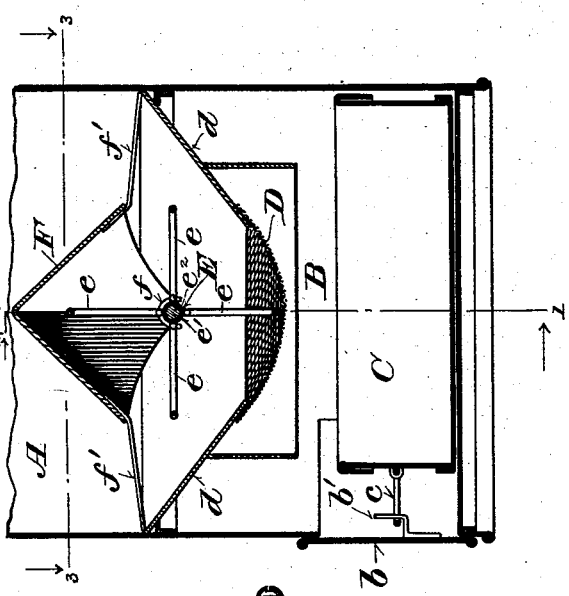
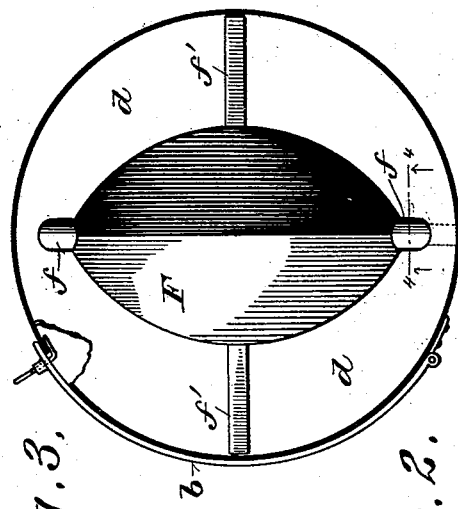
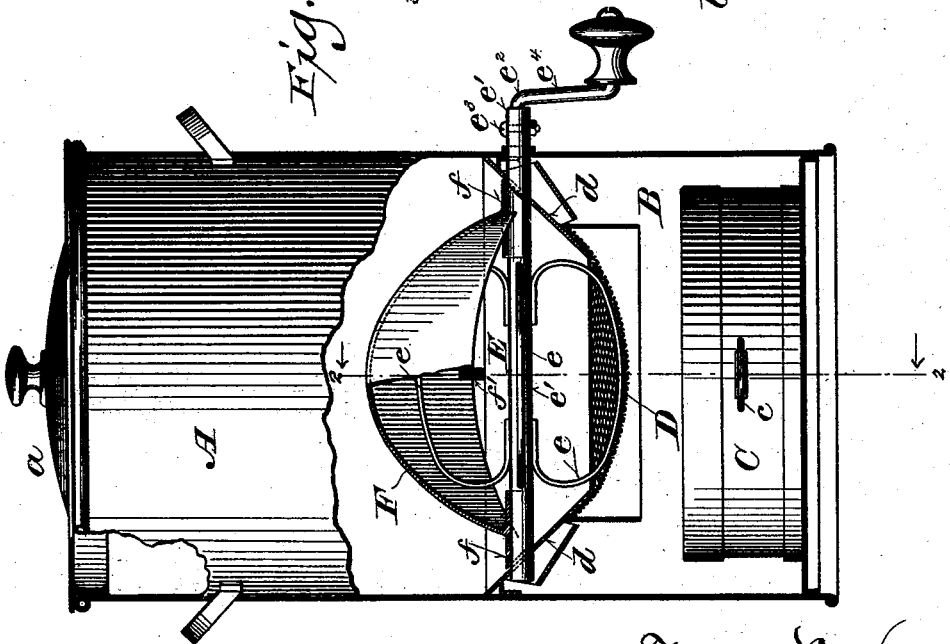
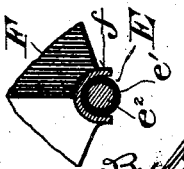
Witnesses
Geo. W. Young.
Chas. L. Goss.
Inventor
Abraham Wolff,
By [his] Attorneys

UNITED STATES PATENT OFFICE.

ABRAHAM WOLFF, OF MILWAUKEE, WISCONSIN, ASSIGNOR TO THE GENDER & PAESCHKE MANUFACTURING COMPANY, OF SAME PLACE.

COMBINED FLOUR BIN AND SIFTER.

SPECIFICATION forming part of Letters Patent No. 509,276, dated November 21, 1893.

Application filed September 28, 1892. Serial No. 447,146. (No model.)

*To all whom it may concern:*

Be it known that I, ABRAHAM WOLFF, of Milwaukee, in the county of Milwaukee and State of Wisconsin, have invented certain new and useful Improvements in a Combined Flour Bin and Sifter; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to prevent the flour from settling and resting in a compact mass upon the sifter, and thereby interfering with the operation of the sifter, and generally to improve the construction and operation of devices of this class.

It consists essentially of a shield placed in the lower portion of the bin over the sifter, and of certain other novel features in construction and arrangement of parts hereinafter particularly described and pointed out in the claims.

In the accompanying drawings like letters designate the same parts in the several figures.

Figure 1 is a view of my improved flour bin and sifter partly in side elevation and partly in vertical section through the center, on the line 1, 1, Fig. 2. Fig. 2 is a similar section of the sifter and lower portion of the bin on the line 2, 2, Fig. 1. Fig. 3 is a horizontal section of the bin on the line 3, 3, Fig. 2; and Fig. 4 is a vertical section on an enlarged scale on the line 4, 4, Fig. 3, of the agitator shaft and one of the shield supporting bearings resting thereon.

A represents the flour bin or receptacle, and B the sub-chamber below it, both of which may be inclosed by a cylindrical casing of sheet metal or other suitable material. The bin A is provided with a removable cover $a$, at the top, and the sub-chamber B is provided on one side of the casing with a door $b$, through which is inserted and removed a pan or basin C.

The sifter located at the bottom or in the lower portion of the flour bin or receptacle, consists in the present case of a concave sieve D, placed in an opening of the inclined or funnel-shaped bottom $d$ of the bin, and of an agitator comprising wire wings or brushes, $e$ $e$, attached to a crank shaft E, and arranged to sweep over the upper surface of said sieve when the crank is turned on the outside of the bin. The crank shaft to which the agitator brushes $e$ $e$ are attached consists of a tube or sleeve $e'$, having bearings in the bottom of the bin and projecting at one end through the casing, and of a rod $e^2$, which is inserted in the open protruding end of said tube and secured therein by a screw pin or rivet $e^3$ outside of the casing, one end of said rod being bent to form a crank $e^4$. The tube or sleeve $e'$ is preferably made of tin or some metal or material which will not rust and injuriously affect the contents of the bin with which it comes in contact. By this construction and arrangement of the agitator shaft, the parts are easily assembled and are made strong, cheap and durable. By removing the pin or screw $e^3$, the rod $e^2$ can be withdrawn and the crank $e^4$ removed and placed inside of the bin, to prevent injury thereto and to economize space, for the purpose of storage or shipment. In other respects the construction of the device as hereinbefore described, is similar to that of the combined bin and sifter shown and described in United States Letters Patent No. 473,543, granted to me April 26, 1892.

F represents an arch-shaped shield constituting a housing for the rotary agitator and formed with concave bearing supports $f$ $f$, which are adapted to rest upon the upper side of the crank shaft E. It is also provided at intermediate points on the sides with laterally projecting arms $f'$ $f'$, which bear upon the bottom $d$ of the bin, as shown in Fig. 2, and support the shield in place directly over the agitator. By the employment of this shield constructed and arranged substantially as shown and described, the flour contained in the bin or receptacle A is prevented from settling in a compact mass upon the sifter, and thereby interfering with its easy operation. At the same time it is guided over its inclined sides and between its edges and the inclined bottom $d$, of the bin, to the sifter, which is thus supplied with the requisite quantity of flour as long as the contents of the bin hold out. The shield is made removable for the purpose of affording easy access to the agitator and the sieve in case they require attention, or any coarse or foreign materials get into the sifter and need to be removed.

I do not wish to limit myself to the precise form and construction of shield nor to the use of such a shield in connection with the specific form of sifter herein shown and described as it is obvious that they may be variously modified in minor details and still embody the essentials of this invention as herein illustrated and be within the scope of it.

In order to withdraw the pan C and to replace it in the sub-chamber B automatically by the opening and closing of the door b, an operation which will oftentimes be found convenient, I provide the door b on the inside with a hook b' over which a loop or ring c, hinged to the pan C, may be turned. By this means the pan may be connected with or disconnected from the door b, so as to be operated by or independently thereof, at will.

The shield F being provided with bearings f f, which rest loosely upon the agitator shaft, a slight vibratory or shaking movement is imparted to the shield by the rotation of the agitator, and the flour is thereby prevented from clinging to said shield and is caused to flow down over its inclined surface.

It is obvious that the dimensions and shape of the bin and sub-chamber, as well as the construction and material of the inclosing casing, may be variously changed within the spirit of my invention.

I claim—

1. In a combined flour bin and sifter comprising a flour receptacle and sieve in the bottom of said receptacle, the combination of a rotary agitator within said receptacle having arms or wings arranged to sweep over the upper surface of said sieve, and a shield having inclined sides placed over and constituting a housing for said agitator, with its lower edges normally terminating above the sieve to permit the flow of flour from above the shield to the sieve while the weight of flour contained in said receptacle is taken off from said agitator and prevented from obstructing its operation, substantially as and for the purposes set forth.

2. The combination with a flour bin and sifter of a shield detachably supported in the lower portion of the bin over the sifter with its lower edge standing normally above the sifter and at a distance from the wall of the bin to form a passage way for the flow of flour from above the shield to the sifter while at the same time preventing the flour from settling in a compact mass upon the sifter, the shield being separate from the sifter and from any permanent part of the bin to permit its removal through the bin to allow access to the sifter substantially as and for the purposes set forth.

3. The combination in a flour bin, of a sifter comprising a sieve and an agitator placed in the lower portion of the bin over the sifter, and a removable shield placed over the agitator with its lower edge standing normally above the sieve and at a distance from the wall of the bin to form a passage way for the flow of flour from above the shield to the sieve and adapted to prevent the flour from settling in a compact mass upon the agitator, substantially as and for the purposes set forth.

4. In a flour bin and sifter, the combination of a flour receptacle, a sub-chamber, a sieve in the bottom of the bin, and a rotary agitator comprising a crank shaft composed of a continuous tube having bearings in the bottom of the bin and projecting at one end through the casing, and of a rod provided at one end with a crank and inserted at the other end in said tube in which it is completely enveloped within the bin and whereby no portion of the rod is exposed within the bin and secured by a screw or pin outside of the casing, and wings or arms attached to said tube and arranged to sweep over the upper surface of said sieve, substantially as and for the purposes set forth.

5. In a flour bin and sifter, the combination of a sieve in the bottom of the bin, a rotary agitator provided with wings or arms adapted to sweep over the upper surface of said sieve, and a shield having inclined sides placed over said agitator with a space between it and the walls of the bin, through which space the flour is permitted to pass to the agitator and sieve, said shield resting loosely upon the bottom of the bin and being freely removable therefrom substantially as and for the purposes set forth.

6. In a flour bin and sifter, the combination with a flour receptacle, a sub-chamber provided with a door and a removable pan, which is adapted to rest upon the bottom of said sub-chamber and a sifter between the flour receptacle and sub-chamber, of a separable fastening by which said pan may be connected with the door of the sub-chamber and be withdrawn from or replaced in said chamber by the opening or closing of said door, or may be detached and left in said sub-chamber when the door is opened substantially as and for the purposes set forth.

7. In a flour bin and sifter, the combination with a rotary agitator placed in the lower portion of the bin, of a shield provided with supporting bearings adapted to rest upon the agitator shaft and at intermediate points with arms or projections adapted to bear against the bottom or walls of the bin, substantially as and for the purposes set forth.

8. In a flour bin and sifter, the combination with a flour receptacle and agitator, of a shield loosely mounted upon the agitator so as to receive a vibratory or shaking movement therefrom, substantially as and for the purposes set forth.

In testimony that I claim the foregoing as my own I affix my signature in presence of two witnesses.

ABRAHAM WOLFF.

Witnesses:
HENRY F. MILLMANN,
CHAS. L. GOSS.

Correction in Letters Patent No. 509,276.

It is hereby certified that the name of the assignee in Letters Patent No. 509,276, granted November 21, 1893, upon the application of Abraham Wolff, of Milwaukee, Wisconsin, for an improvement in "A Combined Flour Bin and Sifter," was erroneously written and printed "Geuder & Paeschke Manufacturing Company," whereas said name should have been written and printed *Geuder & Paeschke Manufacturing Company;* and that the said Letters Patent should be read with this correction therein that the same may conform to the files and records of the case in the Patent Office.

Signed, countersigned, and sealed this 19th day of December, A. D. 1893.

[SEAL.]

JNO. M. REYNOLDS,
*Assistant Secretary of the Interior.*

Countersigned:
JOHN S. SEYMOUR,
*Commissioner of Patents.*